United States Patent
Lai

(10) Patent No.: US 10,760,769 B2
(45) Date of Patent: Sep. 1, 2020

(54) OPTICAL ELEMENT AND LIGHT ASSEMBLY

(71) Applicant: Juluen Enterprise Co., Ltd., New Taipei (TW)

(72) Inventor: Wen-Hsiang Lai, New Taipei (TW)

(73) Assignee: Juluen Enterprise Co., Ltd., New Taipei (TW)

( * ) Notice: Subject to any disclaimer, the term of this patent is extended or adjusted under 35 U.S.C. 154(b) by 7 days.

(21) Appl. No.: 16/203,506

(22) Filed: Nov. 28, 2018

(65) Prior Publication Data

US 2019/0170325 A1 Jun. 6, 2019

(30) Foreign Application Priority Data

Dec. 4, 2017 (TW) .............................. 106142430 A

(51) Int. Cl.
  *F21V 7/04* (2006.01)
  *G02B 27/09* (2006.01)
  *F21V 8/00* (2006.01)
  *B60Q 1/00* (2006.01)
  *F21S 41/00* (2018.01)
  *F21Y 115/10* (2016.01)
  (Continued)

(52) U.S. Cl.
  CPC ................. *F21V 7/04* (2013.01); *B60Q 1/00* (2013.01); *F21S 41/00* (2018.01); *G02B 6/0031* (2013.01); *G02B 27/0977* (2013.01); *F21V 5/04* (2013.01); *F21V 7/0091* (2013.01); *F21Y 2115/10* (2016.08)

(58) Field of Classification Search
  CPC .......... F21V 7/0091; F21V 7/04; F21V 7/041; F21V 7/045; F21V 7/046; F21V 7/048; F21V 7/06; F21V 7/07; F21V 7/08; F21V 7/09; F21V 5/04; G02B 19/0028; G02B 19/0066; F21Y 2115/10; F21Y 2103/10
  See application file for complete search history.

(56) References Cited

U.S. PATENT DOCUMENTS

2005/0276061 A1* 12/2005 Repetto ................. F21V 7/0091
  362/516
2006/0072313 A1* 4/2006 Magarill ............... F21V 7/0091
  362/227

(Continued)

FOREIGN PATENT DOCUMENTS

CN 203980145 12/2014
CN 103759221 2/2016

*Primary Examiner* — Eric Kryukova
(74) *Attorney, Agent, or Firm* — JCIPRNET

(57) ABSTRACT

An optical element includes a light entry surface configured to receive light, a light emission surface having a first light emission sub-surface and a second light emission sub-surface connected to each other, and a reflecting surface having a first reflecting sub-surface and a second reflecting sub-surface connected between the first reflecting sub-surface and the second light emission sub-surface. A first portion of the light is transmitted to the light entry surface and the first light emission sub-surface in sequence. A second portion of the light is transmitted to the light entry surface, the second reflecting sub-surface, and the second light exit sub-surface in sequence. A third portion of the light is transmitted to the light entry surface, the first reflecting sub-surface, the second reflecting sub-surface, and the second light emission sub-surface in sequence.

20 Claims, 20 Drawing Sheets

(51) Int. Cl.
  *F21V 5/04*    (2006.01)
  *F21V 7/00*    (2006.01)

(56) References Cited

U.S. PATENT DOCUMENTS

| | | | |
|---|---|---|---|
| 2010/0238666 A1* | 9/2010 | Ominato | G02B 19/0028 |
| | | | 362/308 |
| 2010/0296283 A1* | 11/2010 | Taskar | F21V 5/04 |
| | | | 362/235 |
| 2014/0192547 A1* | 7/2014 | Kumar | B60Q 1/00 |
| | | | 362/522 |
| 2014/0286018 A1* | 9/2014 | Zhang | G02B 19/0047 |
| | | | 362/311.02 |
| 2016/0084469 A1* | 3/2016 | Fukui | B60Q 1/2653 |
| | | | 362/521 |
| 2017/0184267 A1 | 6/2017 | Courcier | |
| 2018/0331495 A1* | 11/2018 | Nakano | H01S 5/02288 |

* cited by examiner

OPTICAL ELEMENT AND LIGHT ASSEMBLY

CROSS-REFERENCE TO RELATED APPLICATION

This application claims the priority benefit of Taiwan application serial no. 106142430, filed on Dec. 4, 2017. The entirety of the above-mentioned patent application is hereby incorporated by reference herein and made a part of this specification.

BACKGROUND OF THE INVENTION

Field of the Invention

The disclosure relates to an optical element and a light assembly.

Description of Related Art

In prior head light or warning light, a reflecting plate is generally disposed near prior light source to reflect light. However, the reflecting plate absorbs part of light emitted from the prior light source that results in the luminance reducing of the head light or warning light. Moreover, a higher optical accuracy of a relative position between LEDs and an optical element in the head lights or warning lights is required.

SUMMARY OF THE INVENTION

The present disclosure relates to an optical element and a light assembly.

An embodiment of the invention provides an optical element including a light entry surface, a light emission surface, and a reflecting surface.

An embodiment of the invention provides a light assembly including a light source and the aforementioned optical element.

Accordingly, the optical element efficiently redirects the light to a lighting direction. The light source module includes the optical element and produces bright light by the optical element.

DESCRIPTION OF THE EMBODIMENTS

Figure 1:
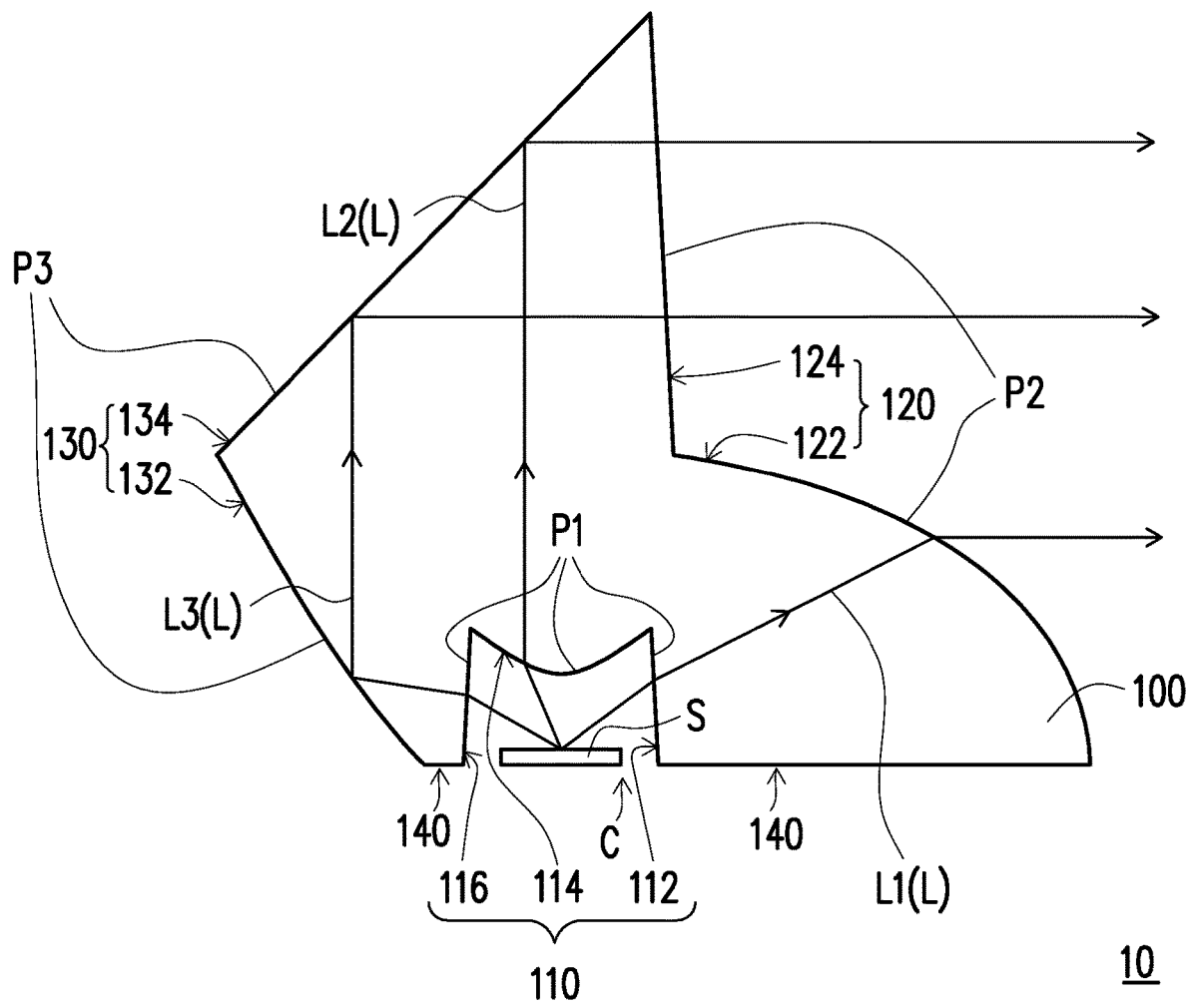
FIG. 1 is a sectional view illustrating a light assembly of an embodiment of the invention.

FIG. 1 is a sectional view illustrating a light assembly according to an embodiment of the invention. Referring to FIG. 1, a light assembly 10 includes a light source S and an optical element 100. The light source S is configured to emit light L. The optical element 100 is disposed on a transmission path of the light L. The optical element 100 includes a light entry surface 110, a light emission surface 120, and a reflecting surface 130. The light entry surface 110 is configured to receive the light L. The light emission surface 120 has a first light emission sub-surface 122 and a second light emission sub-surface 124. The first and second light emission sub-surfaces 122, 124 are connected to each other. The reflecting surface 130 has a first reflecting sub-surface 132 and a second reflecting sub-surface 134. The second reflecting sub-surface 134 is connected between the first reflecting sub-surface 132 and the second light emission sub-surface 124. A first portion L1 of the light L passes through the light entry surface 110, and is refracted by the first light emission sub-surface 122 so as to exit the optical element 100 in sequence. A second portion L2 of the light L passes through the light entry surface 110, is reflected by the second reflecting sub-surface 134, and passes through the second light emission sub-surface 124 so as to exit the optical element 100 in sequence. A third portion L3 of the light L passes through the light entry surface 110, is reflected by the first reflecting sub-surface 132, is reflected by the second reflecting sub-surface 134, and passes through the second light emission sub-surface 124 so as to exit the optical element 100 in sequence. The first, second and third portions L1, L2, L3 of the light L exit the optical element 100 towards the same lateral direction of the optical element. The divergence angles of first, second and the third portions L1, L2, L3 of the light L at the time of exit the optical element 100 is within approximately 10 degrees. Therefore, the optical element 100 redirects the light L to exit the optical element 100 towards the same lateral direction, such that light intensity of the light L is increased.

The light entry surface 110 has a first light entry sub-surface 112, a second light entry sub-surface 114, and a third light entry sub-surface 116. The second light entry sub-surface 114 is connected between the first and third light entry sub-surfaces 112, 116. The first, second and third portions L1, L2, L3 of the light L respectively pass through the first, second and third light entry sub-surfaces 112, 114, 116 to enter the optical element 100. A recess C is defined between the first, second and third light entry sub-surfaces 112, 114, 116. The light source S can be disposed in the recess C.

Figure 11:
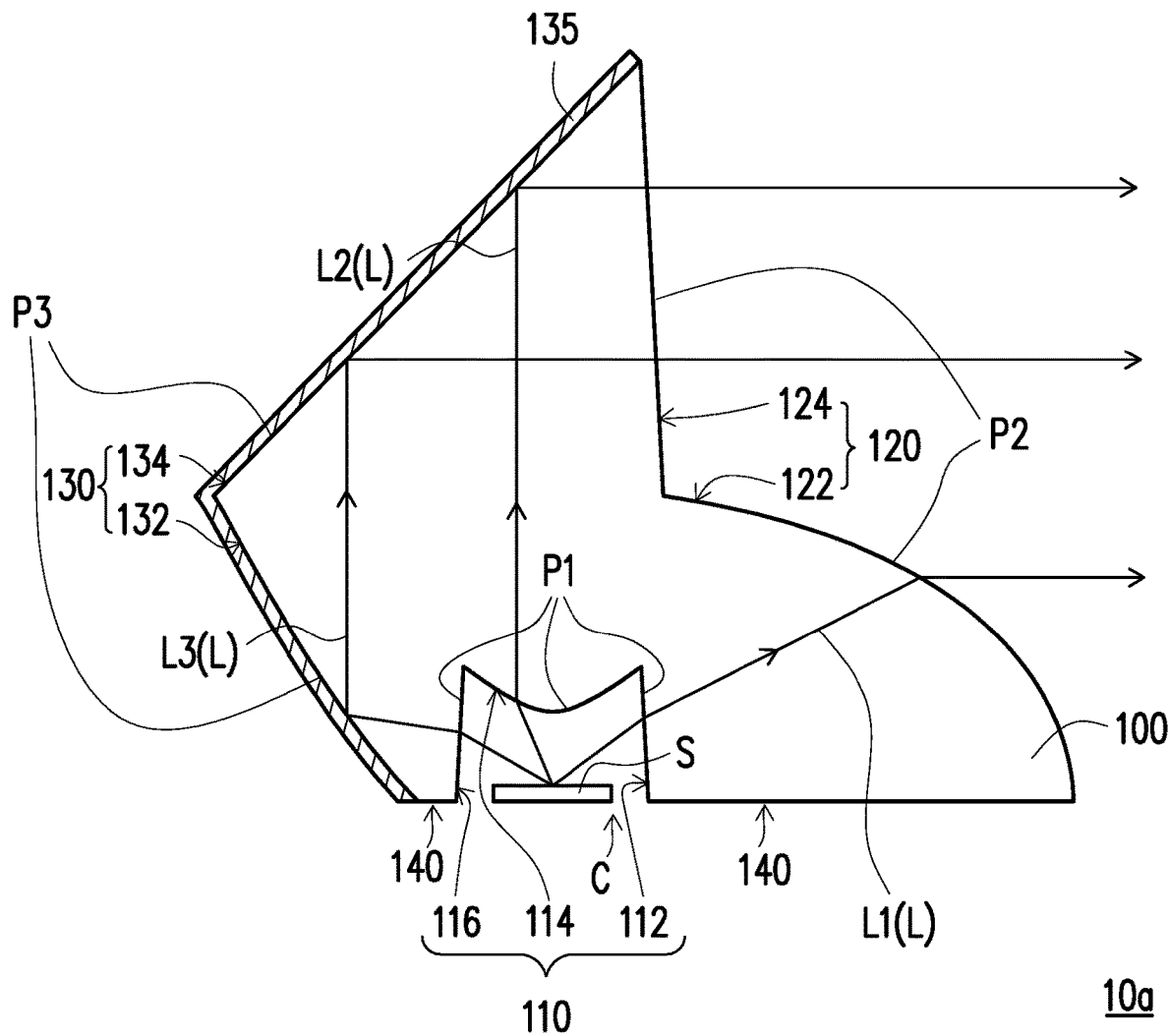
FIG. 11 is a sectional view of a light assembly of another embodiment of the invention.

Since a refractive index of the optical element 100 is higher than that of a medium (e.g., air) outside of the optical element 100, total internal reflection (TIR) with lower loss of the light L may occur with the second portion L2 of the light L reaching second reflecting sub-surface 134, and may occur with the third portion L3 of the light L reaching the first and second reflecting sub-surfaces 132, 134 in sequence. Moreover, in other embodiments (the light assembly 10a illustrated in FIG. 11), the optical element 100 may further include a reflective layer 135 formed on the reflecting surface 130.

Moreover, in this embodiment, the optical element 100 further includes a bottom surface 140 connected between the first light emission sub-surface 122 and the first reflecting sub-surface 132. The recess C is positioned on the bottom surface 140. There is an angle (e.g., 90°) between the second light emission sub-surface 124 and the bottom surface 140. In this embodiment, the material of the optical element 100 may be plastic, acrylate, glass, or other transparent materials. The light source S may be a LED (light-emitting diode) or a high-intensity discharge (HID) lamp. A color of the light L emitted by the light source S may be red, blue, yellow, white, green or purple.

Figure 2A:
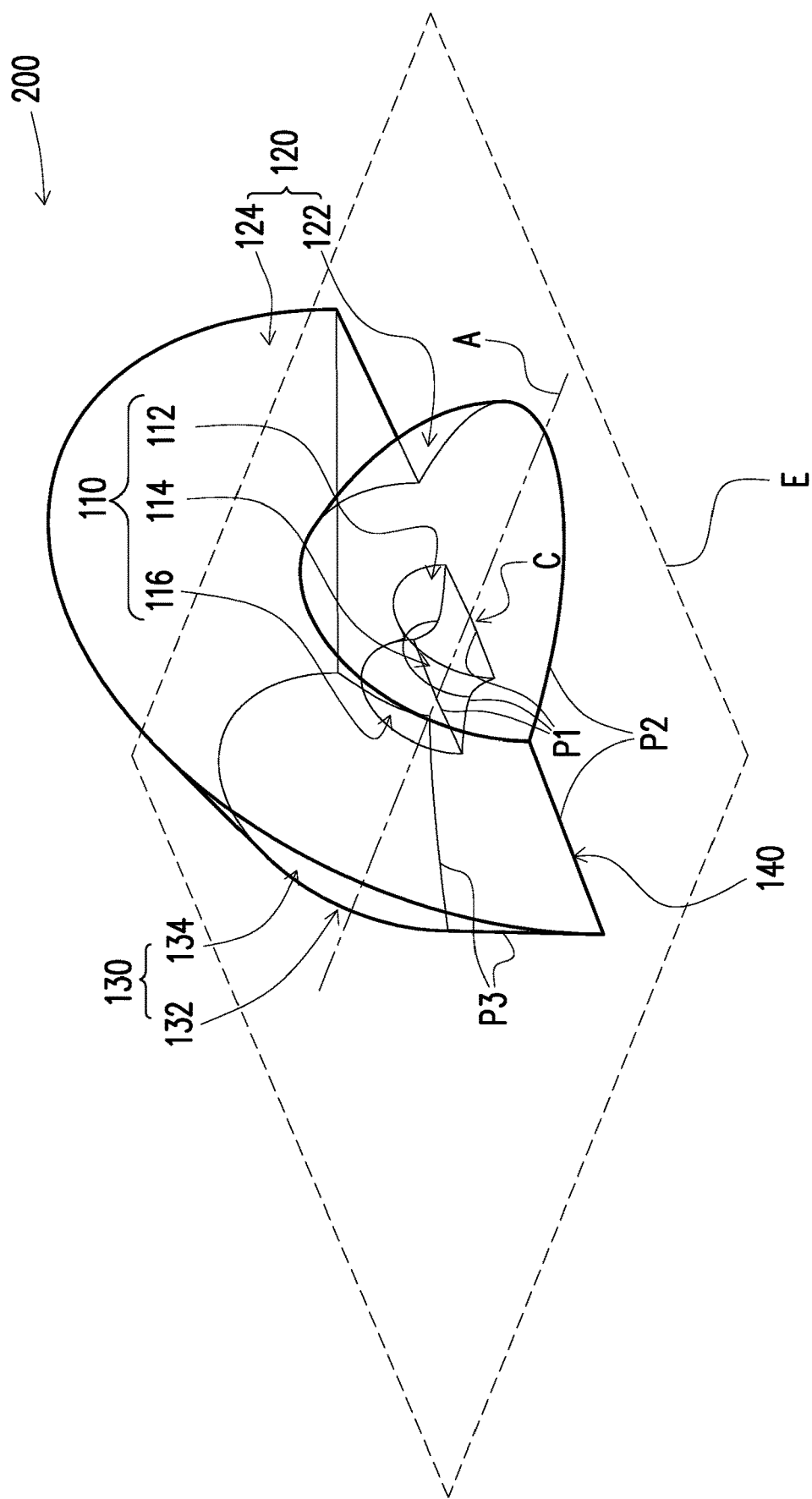
FIG. 2A is a perspective view of an optical element of an embodiment of the invention.
Figure 2B:
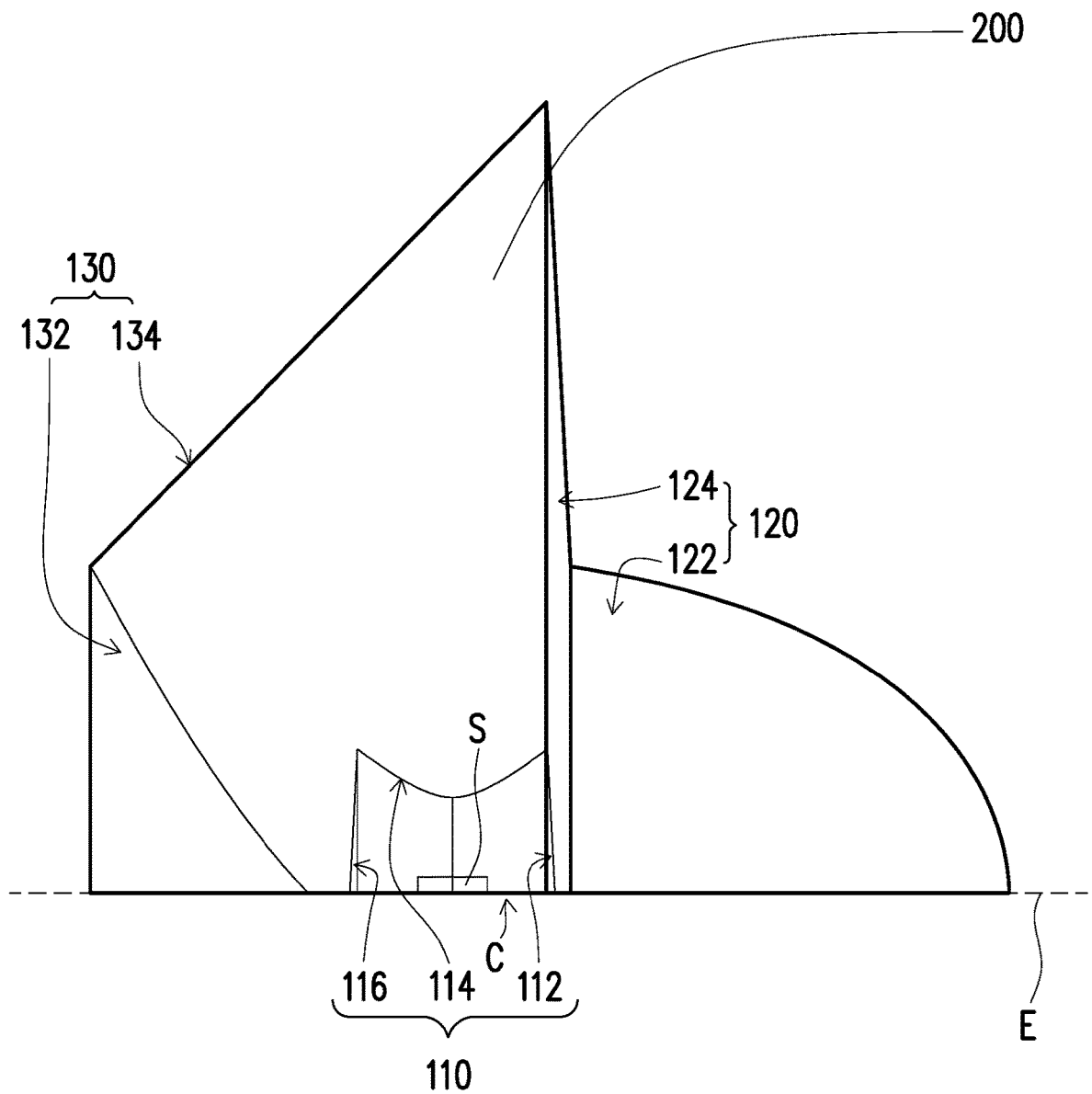
FIG. 2B is a sectional view of a light assembly using the optical element of FIG. 2A.

FIG. 2A is a perspective view of an optical element of an embodiment of the invention. FIG. 2B is a sectional view of a light assembly using the optical element of FIG. 2A. Referring to FIGS. 2A, 2B, the light assembly 20 is similar to the light assembly 10 in FIG. 1, the optical element 200 is similar to the optical element 100 in FIG. 1. Therefore, the light assembly 20 and the optical element 200 are no longer repeated hereafter. The light entry surface 110, the light emission surface 120, and the reflecting surface 130 of the optical element 200 are respectively surfaces of revolution formed by rotating a first line P1, a second line P2, and a third line P3 on a reference plane E around a reference axis A (as shown in FIG. 2A) on the reference plane E by an angle. Both of the first and second light emission sub-surfaces 122, 124 are curved surfaces. The light entry surface 110 is located between the reference axis A and the second reflecting sub-surface 134 of the reflecting surface 130. The reference plane E and the bottom surface 140 are in the same plane. The first, second and third lines P1, P2, P3 respectively correspond to sectional lines of the light entry surface 110, the light emission surface 120, and the reflecting surface 130 of the optical element 100 in FIG. 1. The rotating angle of the first, second and third lines P1, P2, P3 around the reference axis A is 180 degrees.

Figure 3A:
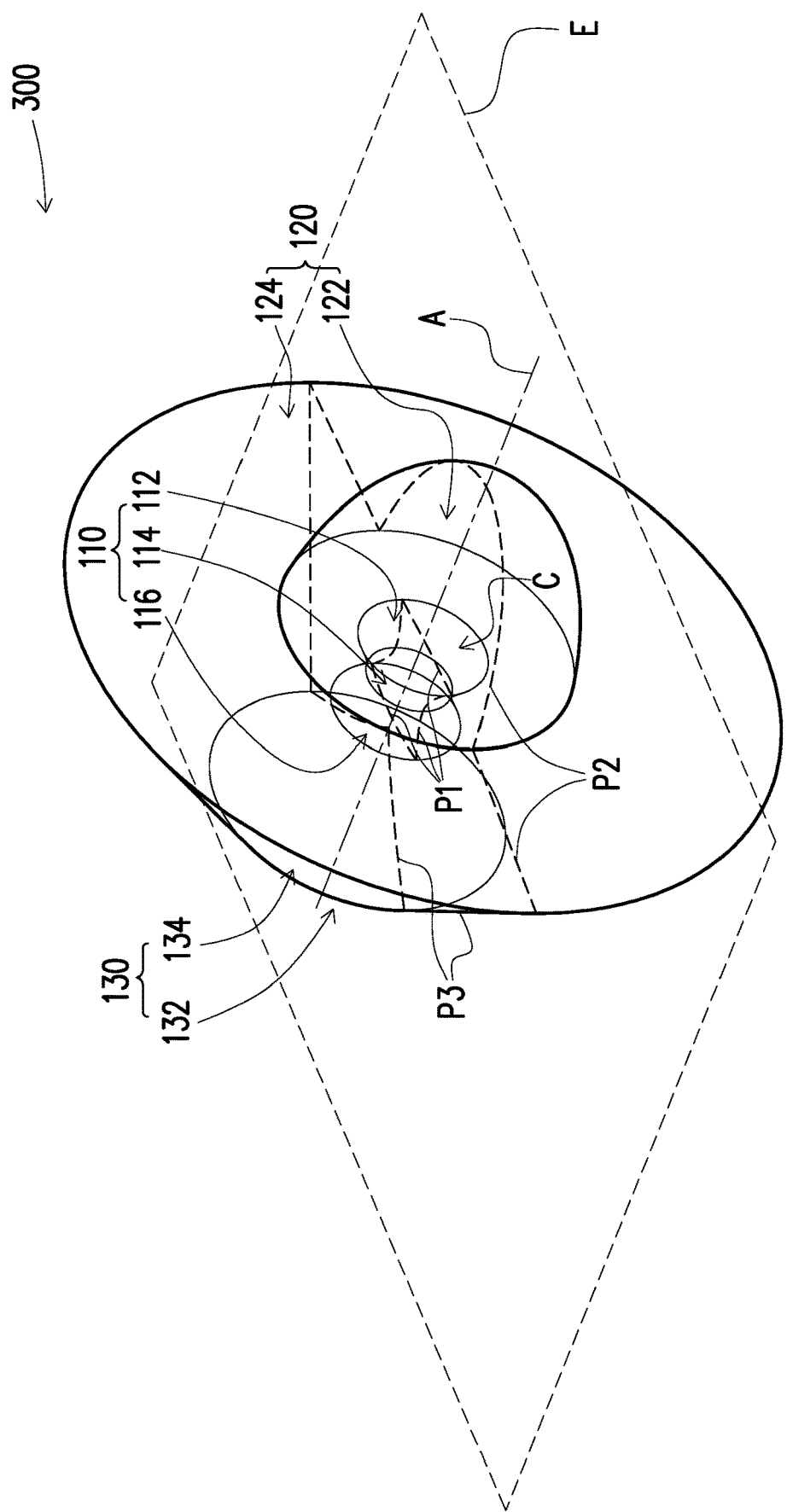
FIG. 3A is a perspective view of an optical element of an embodiment of the invention.
Figure 3B:
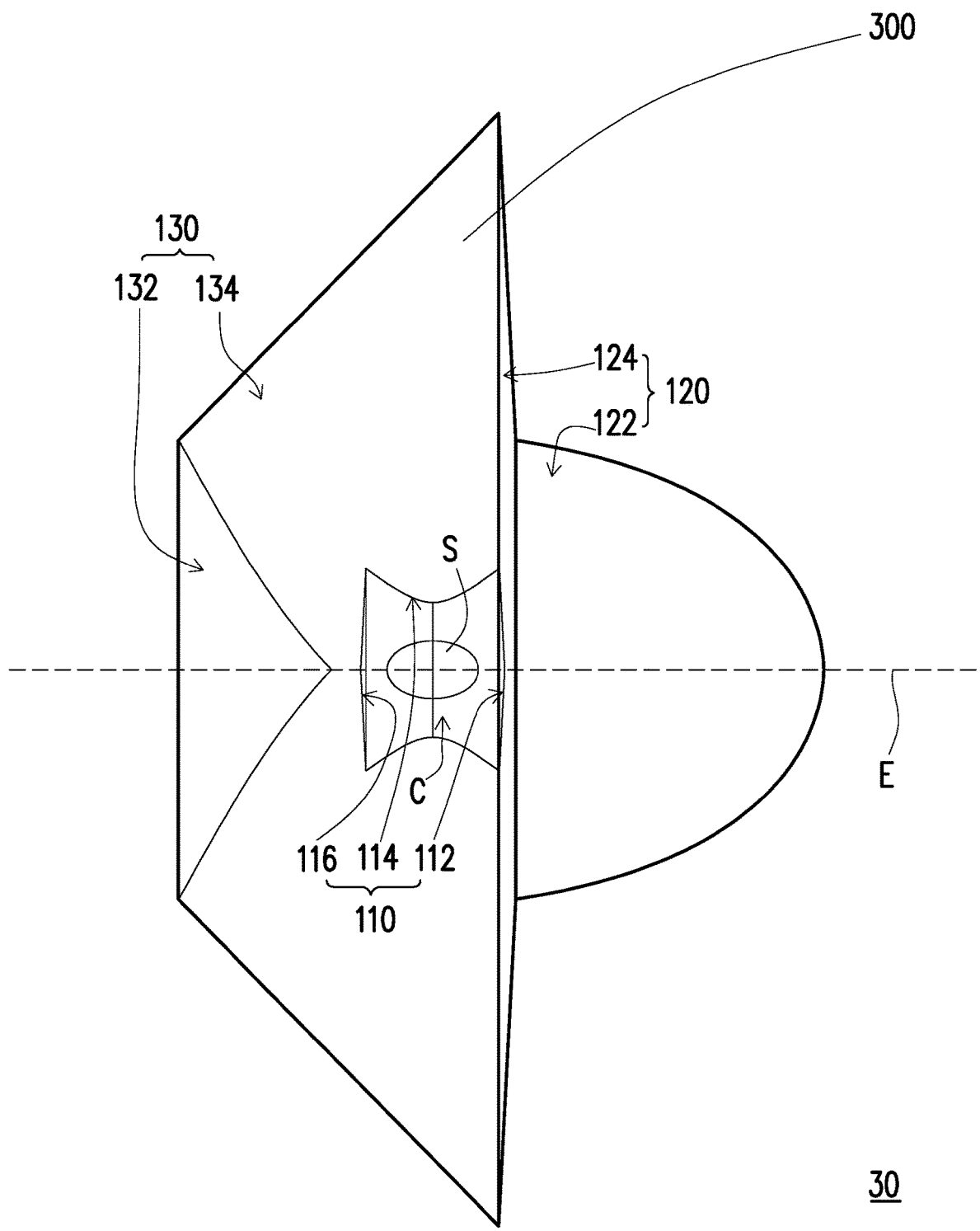
FIG. 3B is a sectional view of a light assembly using the optical element of FIG. 3A.

FIG. 3A is a perspective view of an optical element of an embodiment of the invention. FIG. 3B is a sectional view of a light assembly using the optical element of FIG. 3A. Referring to FIGS. 3A, 3B, the optical element 300 is similar to the optical element 200 shown in FIGS. 2A, 2B. The main difference therebetween is that the rotating angle of the first, second and third lines P1, P2, P3 around the reference axis A is 360 degrees. In this embodiment, the second light entry sub-surface 114 is located between the reference axis A and the second reflecting sub-surface 134. In this embodiment, the light source S is, for example, a high-intensity discharge lamp, but the invention is not limited hereto.

Figure 4A:
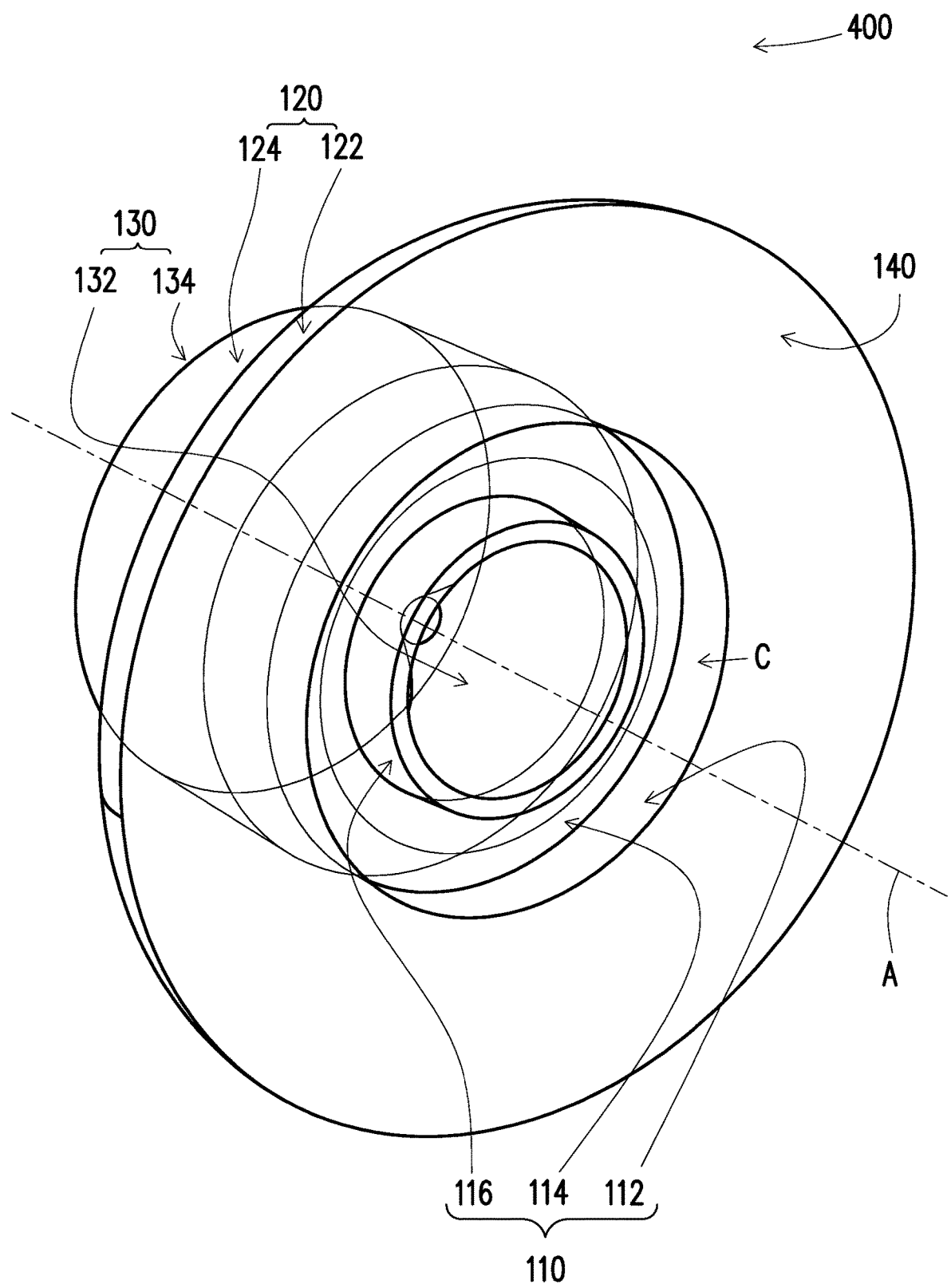
FIG. 4A is a perspective view of an optical element of an embodiment of the invention.
Figure 4B:
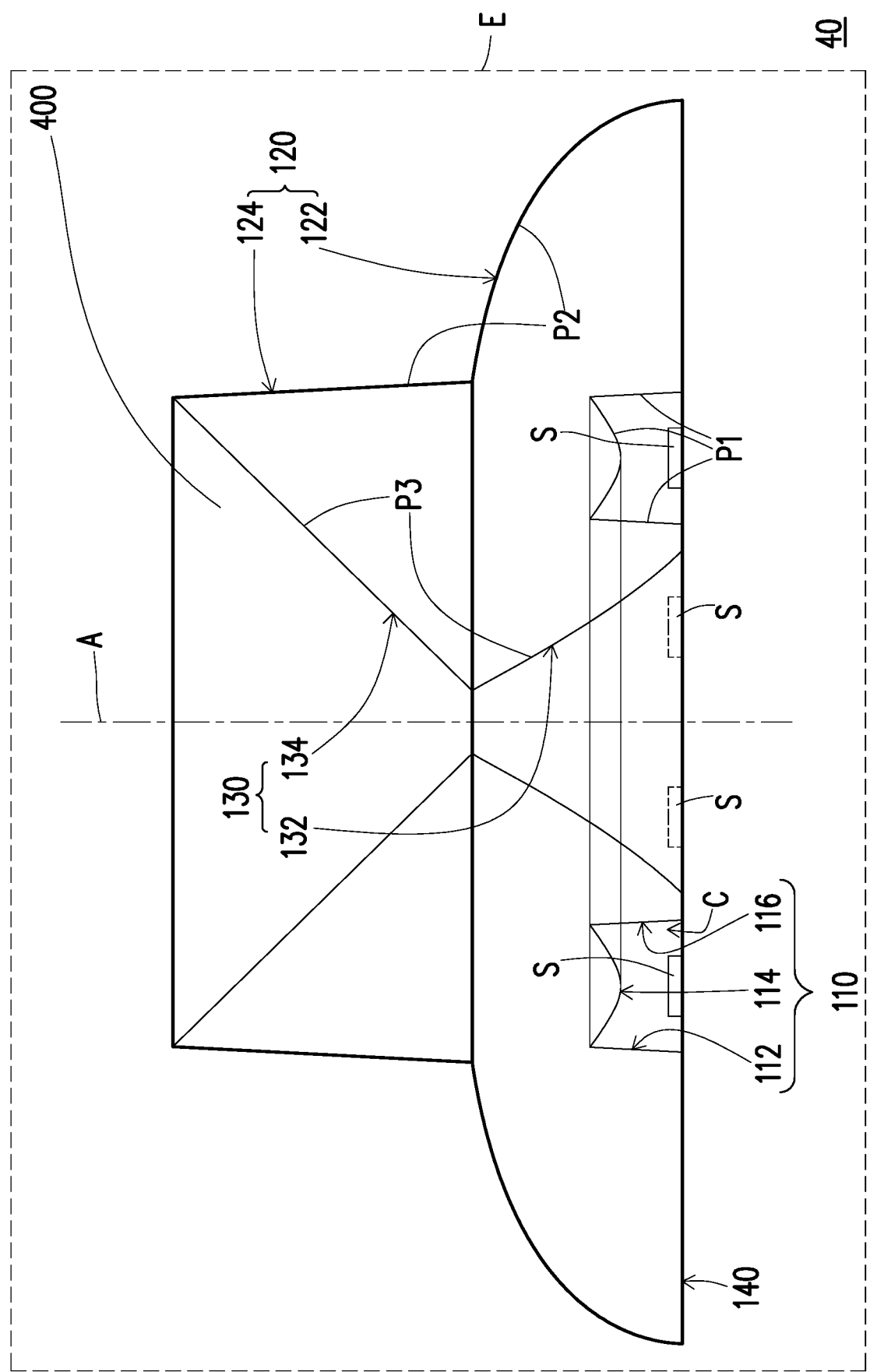
FIG. 4B is a sectional view of a light assembly using the optical element of FIG. 4A.

FIG. 4A is a perspective view of an optical element of an embodiment of the invention. FIG. 4B is a sectional view of a light assembly using the optical element of FIG. 4A. Referring to FIGS. 4A, 4B, the light assembly 40 is similar to the light assembly 10 in FIG. 1, the optical element 400 is similar to the optical element 100 in FIG. 1. Therefore, the light assembly 40 and the optical element 400 are no longer repeated hereafter. The main difference therebetween is that the light entry surface 110, the light emission surface 120, and the reflecting surface 130 of the optical element 400 are respectively surfaces of revolution formed by rotating first, second and third lines P1, P2, P3 (as shown in FIG. 4B) around a reference axis A by an angle. Both of the first and second light emission sub-surfaces 122, 124 are curved surfaces. In this embodiment, the reflecting surface 130 is located between the reference axis A and the light emission surface 120. The first, second and third lines P1, P2, P3 respectively correspond to sectional lines of the light entry surface 110, the light emission surface 120, and the reflecting surface 130 of the optical element 100 in FIG. 1. The rotating angle of the first, second and third lines P1, P2, P3 around the reference axis A is 360 degrees.

The light assembly 40 may be disposed in a circular warning light. The bottom surface 140 of the optical element 400 faces downward. A plurality of light sources S are annularly arranged along the annular recess C of the optical element 400. The light sources S emit light in sequence.

Figure 5A:
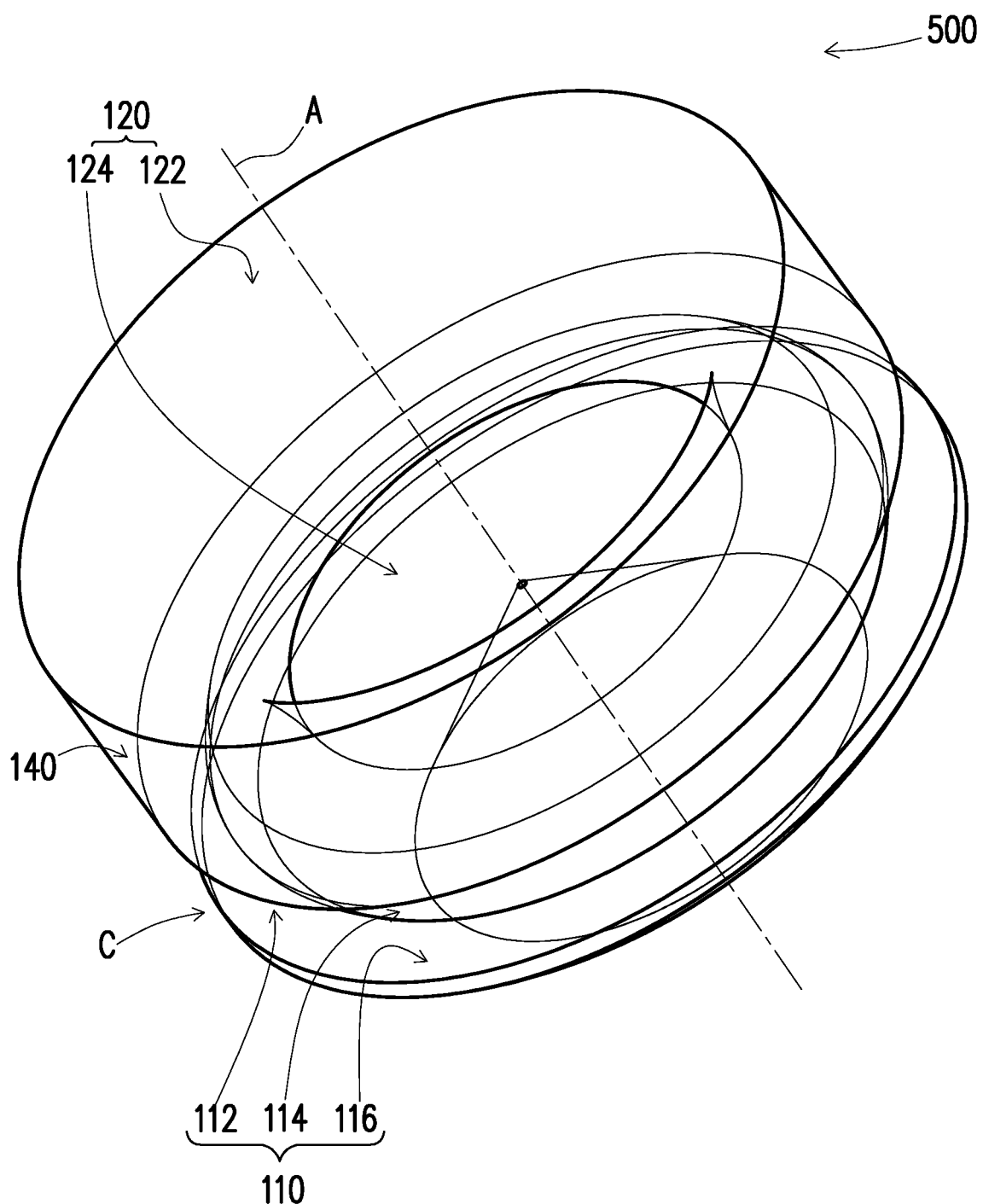
FIG. 5A is a perspective view of an optical element of an embodiment of the invention.
Figure 5B:
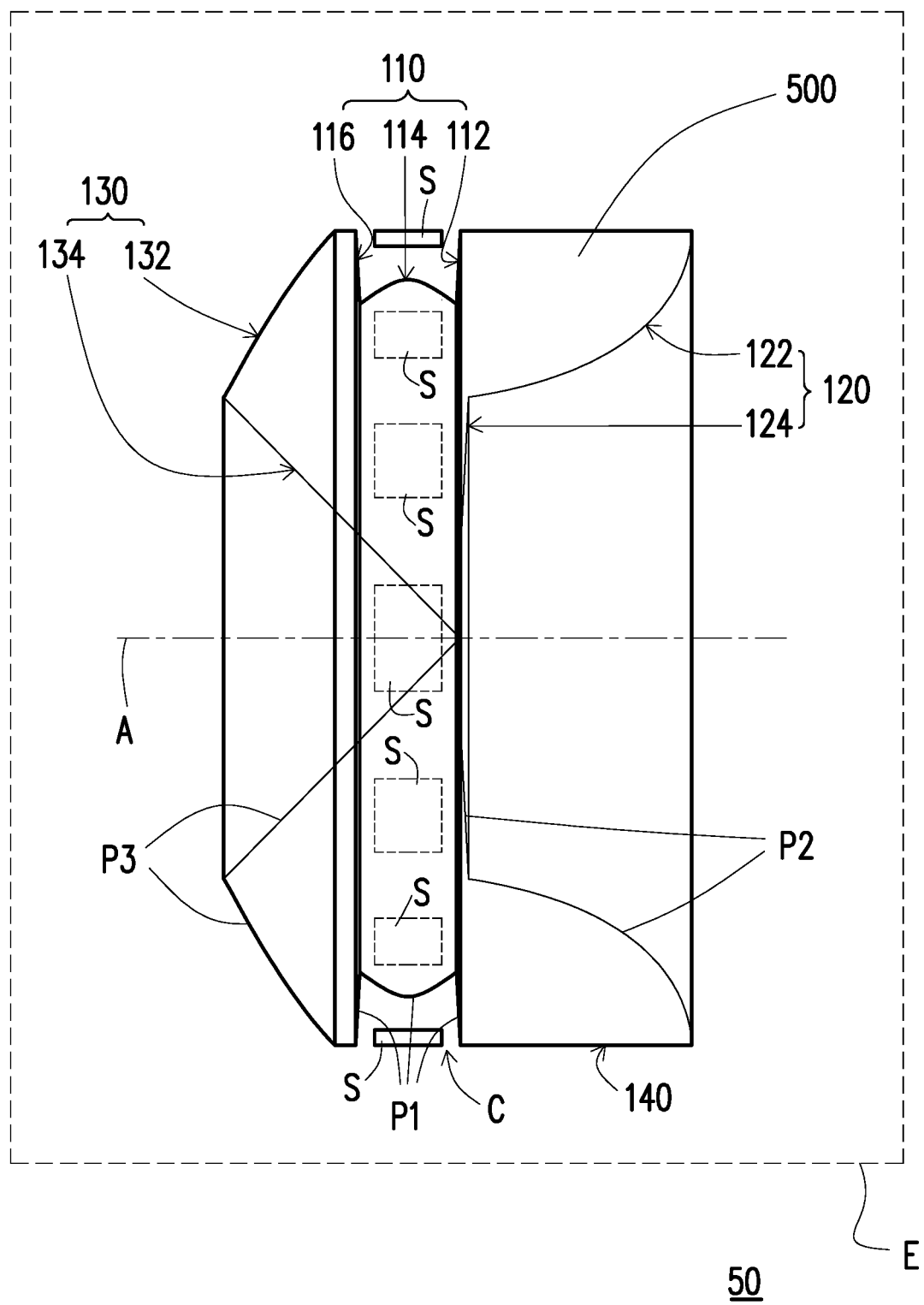
FIG. 5B is a sectional view of a light assembly using the optical element of FIG. 5A.

FIG. 5A is a perspective view of an optical element of an embodiment of the invention. FIG. 5B is a sectional view of a light assembly using the optical element of FIG. 5A. Referring to FIGS. 5A, 5B, the light assembly 50 is similar to the light assembly 10 in FIG. 1, the optical element 500 is similar to the optical element 100 in FIG. 1. Therefore, the light assembly 50 and the optical element 500 are no longer repeated hereafter. The main difference therebetween is that the light entry surface 110, the light emission surface 120, and the reflecting surface 130 of the optical element 500 are respectively surfaces of revolution formed by rotating first, second and third lines P1, P2, P3 (as shown in FIG. 5B) on a reference plane E around a reference axis A on the reference plane E (as shown in FIG. 5B) by an angle. The first and second light emission sub-surfaces 122, 124 are curved surfaces. In this embodiment, the second reflecting sub-surface 134 is located between the reference axis A and the light entry surface 110. The first, second and third lines P1, P2, P3 respectively correspond to sectional lines of the light entry surface 110, the light emission surface 120, and the reflecting surface 130 of the optical element 100 in FIG. 1. The rotating angle of the first, second and third lines P1, P2, P3 around the reference axis A is 360 degrees. However, in other embodiments, the rotating angle of the first, second and third lines P1, P2, P3 around the reference axis A may be 180 degrees or another angle.

In this embodiment, a plurality of light sources S of the light assembly 50 are disposed in the annular recess C, such that the light of the plurality of light sources S is concentrated towards the light emission surface 120.

Figure 6A:
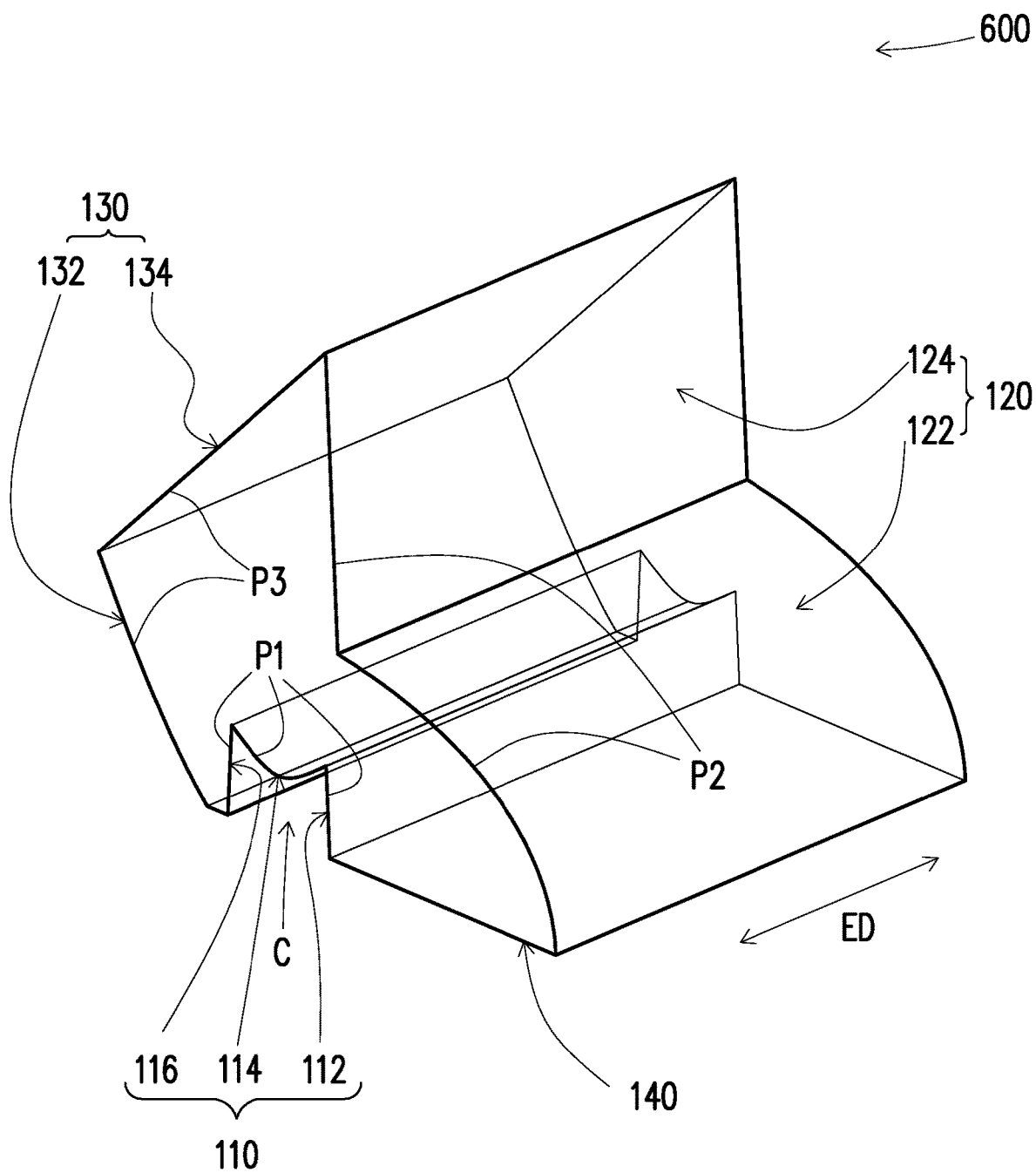
FIG. 6A is a perspective view of an optical element of an embodiment of the invention.
Figure 6B:
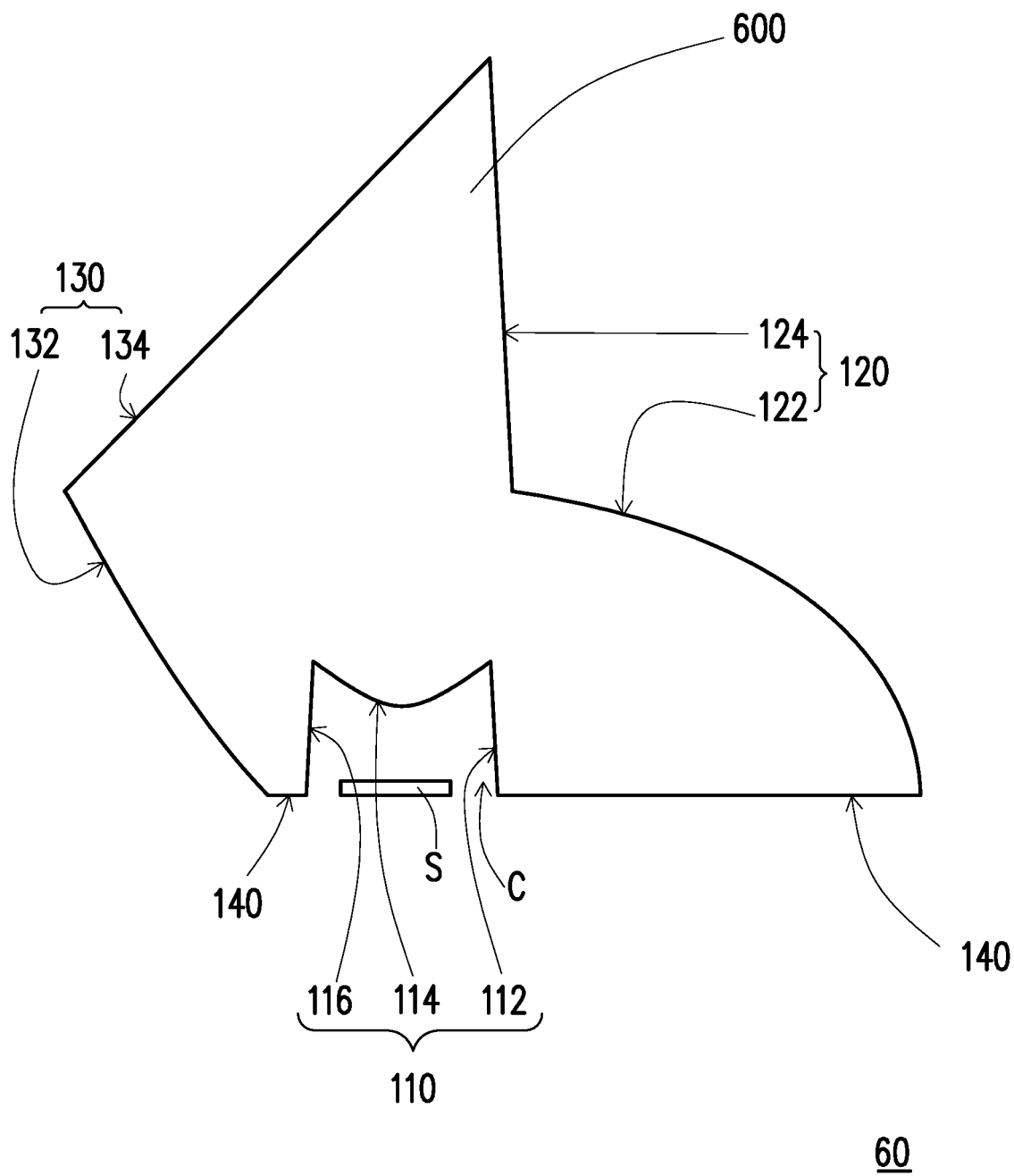
FIG. 6B is a sectional view of a light assembly using the optical element of FIG. 6A.

FIG. 6A is a perspective view of an optical element of an embodiment of the invention. FIG. 6B is a sectional view of a light assembly using the optical element of FIG. 6A. Referring to FIGS. 6A, 6B, the light assembly 60 is similar to the light assembly 10 in FIG. 1, the optical element 600 is similar to the optical element 100 in FIG. 1. Therefore, the light assembly 60 and the optical element 600 are no longer repeated hereafter. The main difference therebetween is that the light entry surface 110, the light emission surface 120, and the reflecting surface 130 all extend along a same extension direction ED (as shown in FIG. 6A). In this embodiment, the first light emission sub-surface 122 is a curved surface, and the second light emission sub-surface 124 is a plane. A plurality of light sources S of the light assembly 60 are arranged along the extension direction ED and are disposed in the recess C of the optical element 600. In other embodiments, at least one of the first and second light emission sub-surfaces 122, 124 has a plurality of arc-shaped light emission sub-surfaces 922', 1022' (e.g., arc-shaped convex surfaces) and/or a plurality of arc-shaped light emission sub-surfaces 924', 1024' (e.g., arc-shaped convex surfaces) as shown in FIGS. 9A, 9B, 10A, 10B.

Figure 7A:
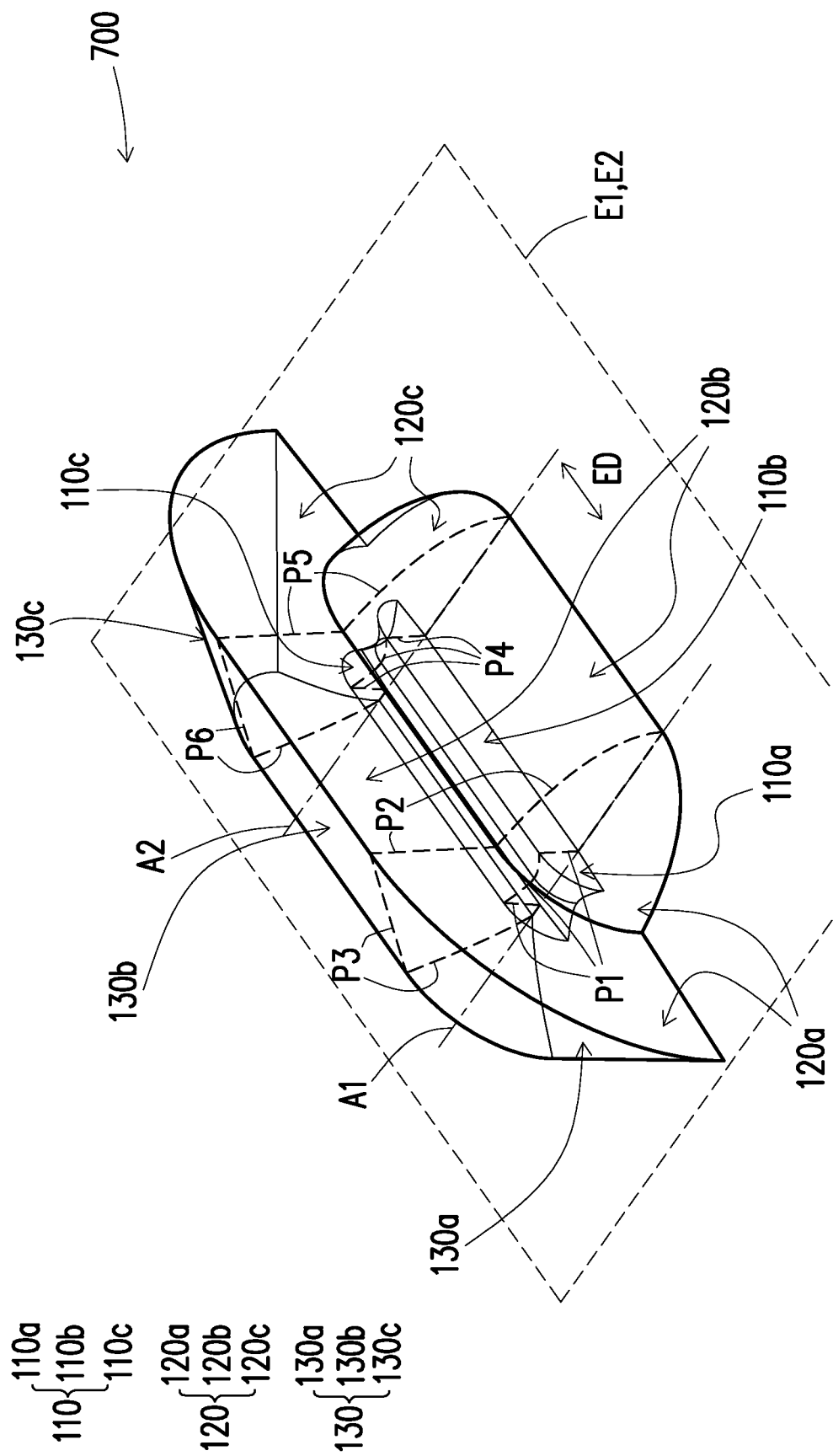
FIG. 7A is a perspective view of an optical element of an embodiment of the invention.
Figure 7B:
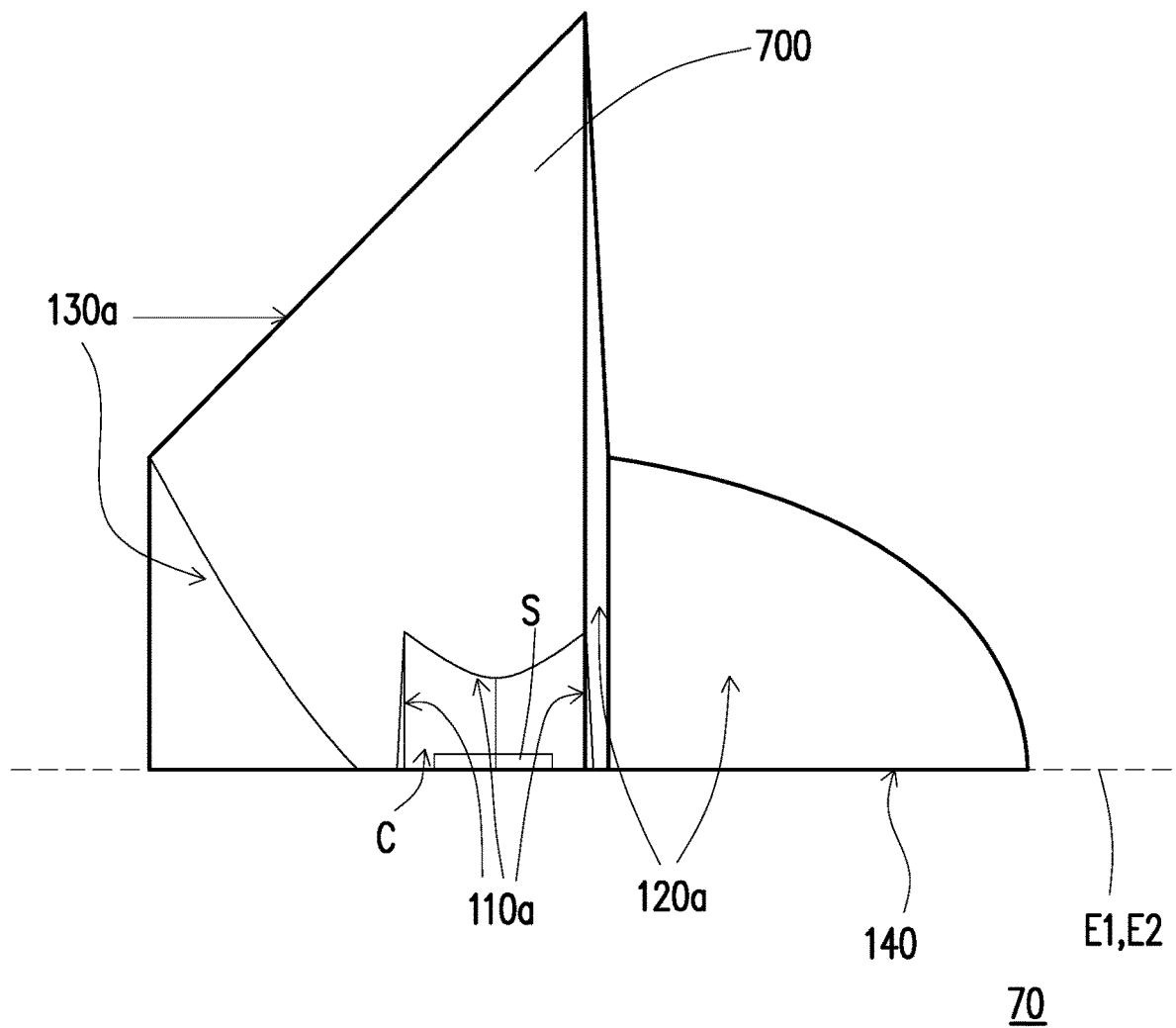
FIG. 7B is a sectional view of a light assembly using the optical element of FIG. 7A.

FIG. 7A is a perspective view of an optical element of an embodiment of the invention. FIG. 7B is a sectional view of a light assembly using the optical element of FIG. 7A. Referring to FIGS. 7A, 7B, the light assembly 70 is similar to the light assembly 10 in FIG. 1, the optical element 700 is similar to the optical element 100 in FIG. 1. Therefore, the light assembly 70 and the optical element 700 are no longer repeated hereafter. The main difference therebetween is that the light entry surface 110 of the optical element 700 includes a first segment light entry surface 110a, a second segment light entry surface 110b, and a third segment light entry surface 110c. The light emission surface 120 includes a first segment light emission surface 120a, a second segment light emission surface 120b, and a third segment light emission surface 120c. The reflecting surface 130 includes a first segment reflecting surface 130a, a second segment reflecting surface 130b, and a third segment reflecting surface 130c. The second segment light entry surface 110b is connected between the first and third segment light entry surfaces 110a, 110c. The second segment light emission surface 120b is connected between the first and third segment light emission surfaces 120a, 120c. The second segment reflecting surface 130b is connected between the first and third segment reflecting surfaces 130a, 130c. Specifically, the first segment light entry surface 110a, the first segment light emission surface 120a, and the first segment reflecting surface 130a are respectively surfaces of revolution formed by rotating first, second and third lines P1, P2, P3 around a first reference axis A1 by a first angle. The second segment light entry surface 110b, the second segment light emission surface 120b, and the second segment reflecting surface 130b all extend along the same extension direction ED (as shown in FIG. 7A). The third segment light entry surface 110c, the third segment light emission surface 120c, and the third segment reflecting surface 130c are respectively surfaces of revolution formed by rotating fourth, fifth, sixth lines P4, P5, P6 around a second reference axis A2 by a second angle. The first and second reference axes A1, A2 are parallel. The extension direction ED is perpendicular to the first and second reference axes A1, A2.

In this embodiment, the first and second reference axes A1, A2 are located on the bottom surface 140 of the optical element 700. The first reference axis A1 passes through two ends of a boundary between the first and second segment light entry surfaces 110a, 110b, an end point in a boundary between the first and second segment light emission surfaces 120a, 120b close to the bottom surface 140, and an end point in a boundary between the first and second segment reflecting surfaces 130a, 130b close to the bottom surface 140. The second reference axis A2 passes through two end points of a boundary between the third segment light entry surface 110c and the second segment light entry surface 110b, an end point in a boundary between the third segment light emission surface 120c and the second segment light emission surface 120b close to the bottom surface 140, and an end point in a boundary between the second and third segment reflecting surfaces 130b, 130c close to the bottom surface 140. The first and second reference planes E1, E2, and the bottom surface 140 of the optical element 700 are coplanar. The first and fourth lines P1, P4 correspond to the sectional line of the light entry surface 110 of the optical element 100 in FIG. 1. The second and fifth lines P2, P5 correspond to the sectional line of the light emission surface 120 of the optical element 100 in FIG. 1. The third and sixth lines P3, P6 correspond to the sectional line of the reflecting surface 130 of the optical element 100 in FIG. 1. The first rotating angle of the first, second and third lines P1, P2, P3 around the first reference axis A1 is 90 degrees. The second rotating angle of the fourth, fifth and sixth lines P4, P5, P6 around the second reference axis A2 is 90 degrees. However, in other embodiments, the first and second rotating angles may respectively be another angle beyond 90 degrees.

In an embodiment, a plurality of light sources S could be disposed in the recess C of the optical element 700.

Figure 8A:
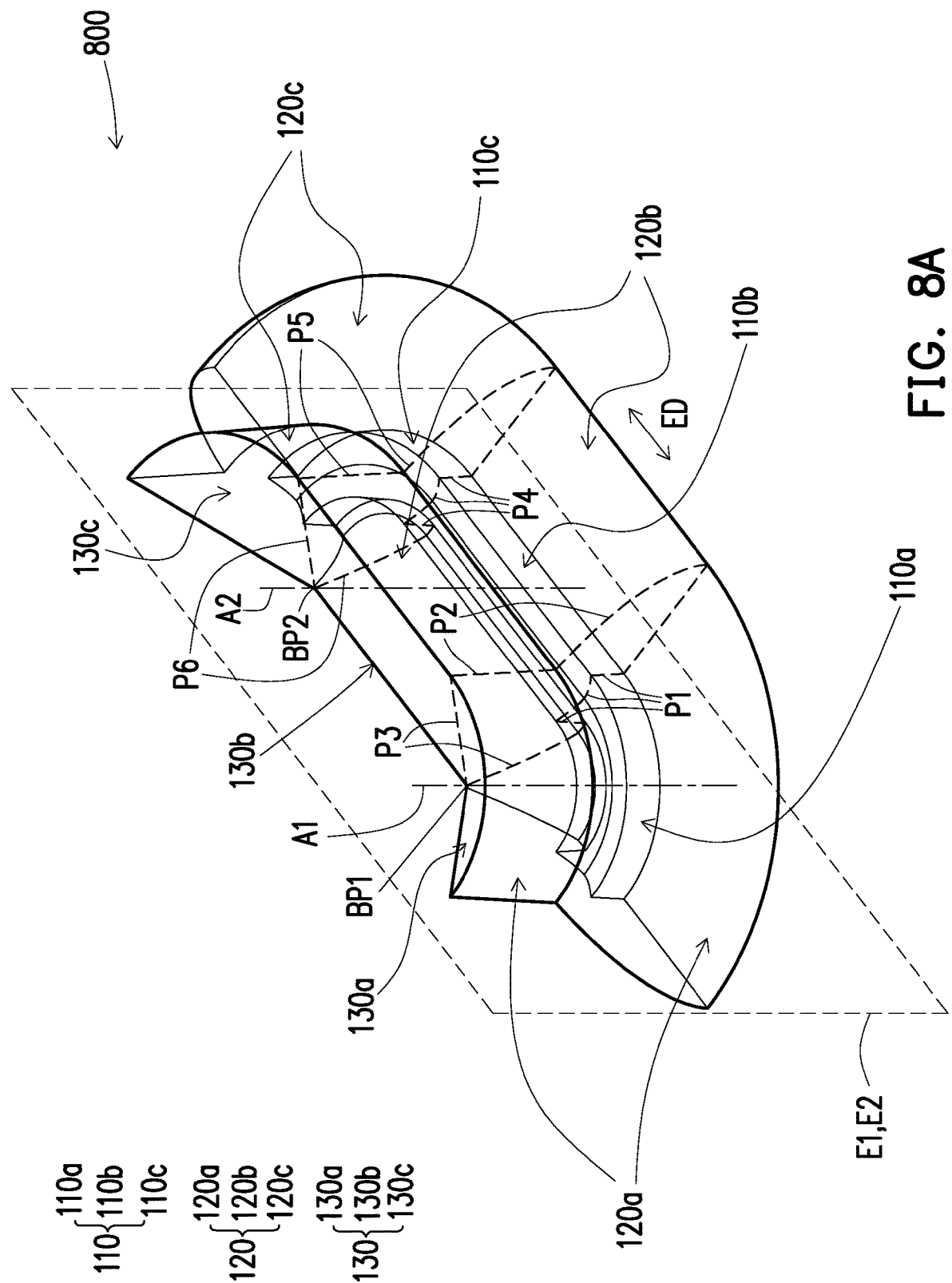
FIG. 8A is a perspective view of an optical element of an embodiment of the invention.
Figure 8B:
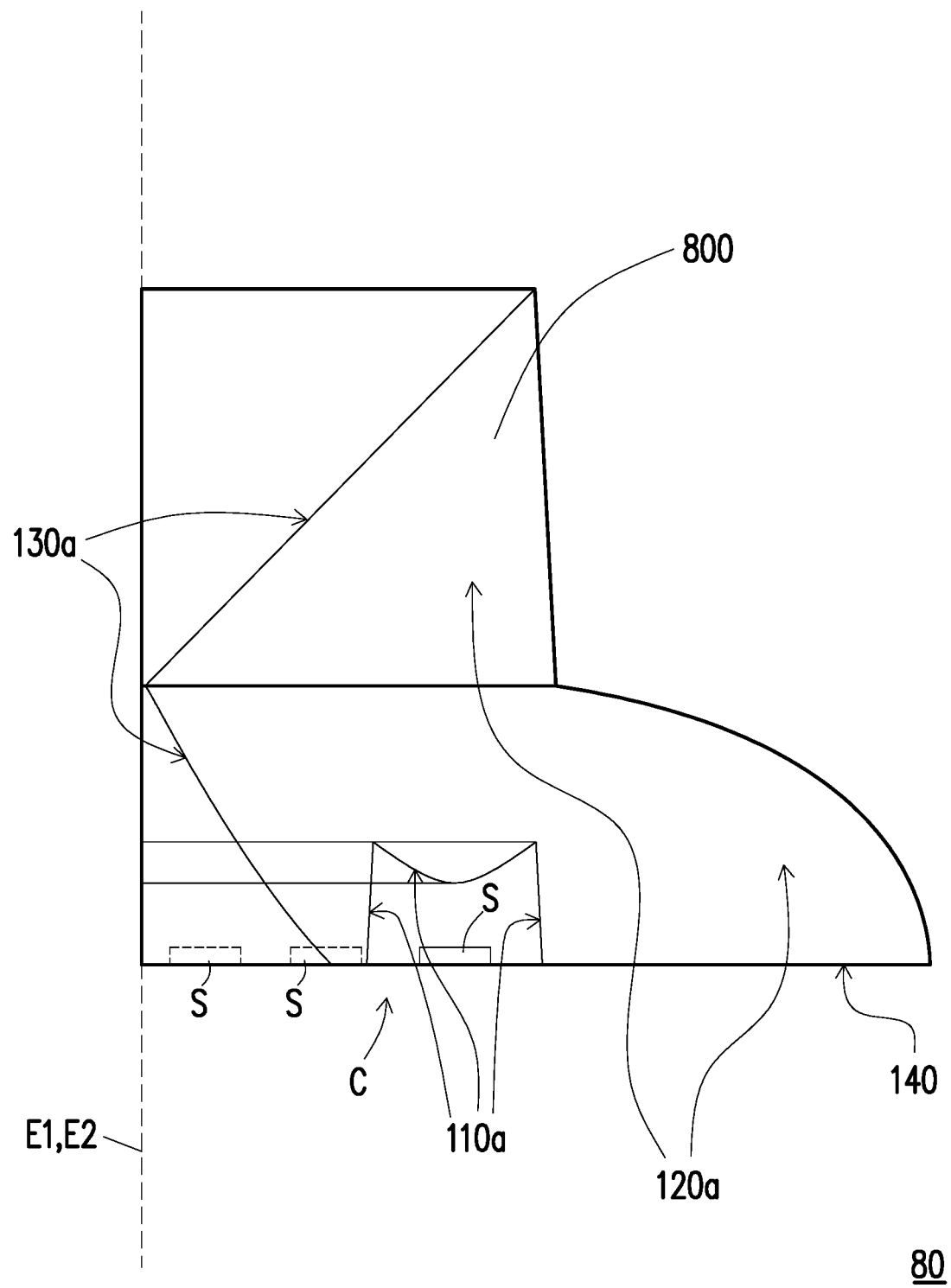
FIG. 8B is a sectional view of a light assembly using the optical element of FIG. 8A.
Figure 9A:
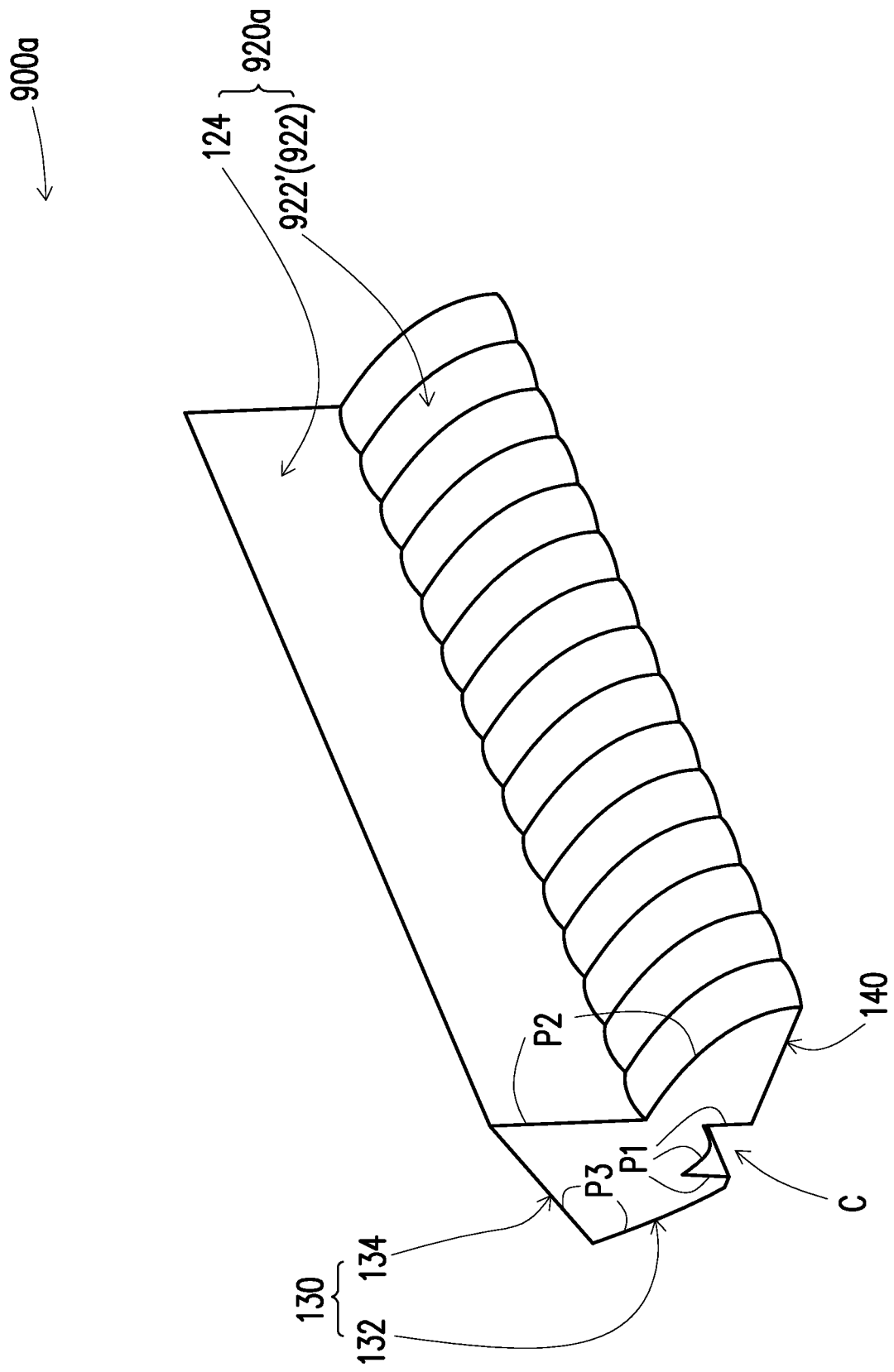
FIG. 9A is a perspective view of an optical element of an embodiment of the invention.
Figure 9B:
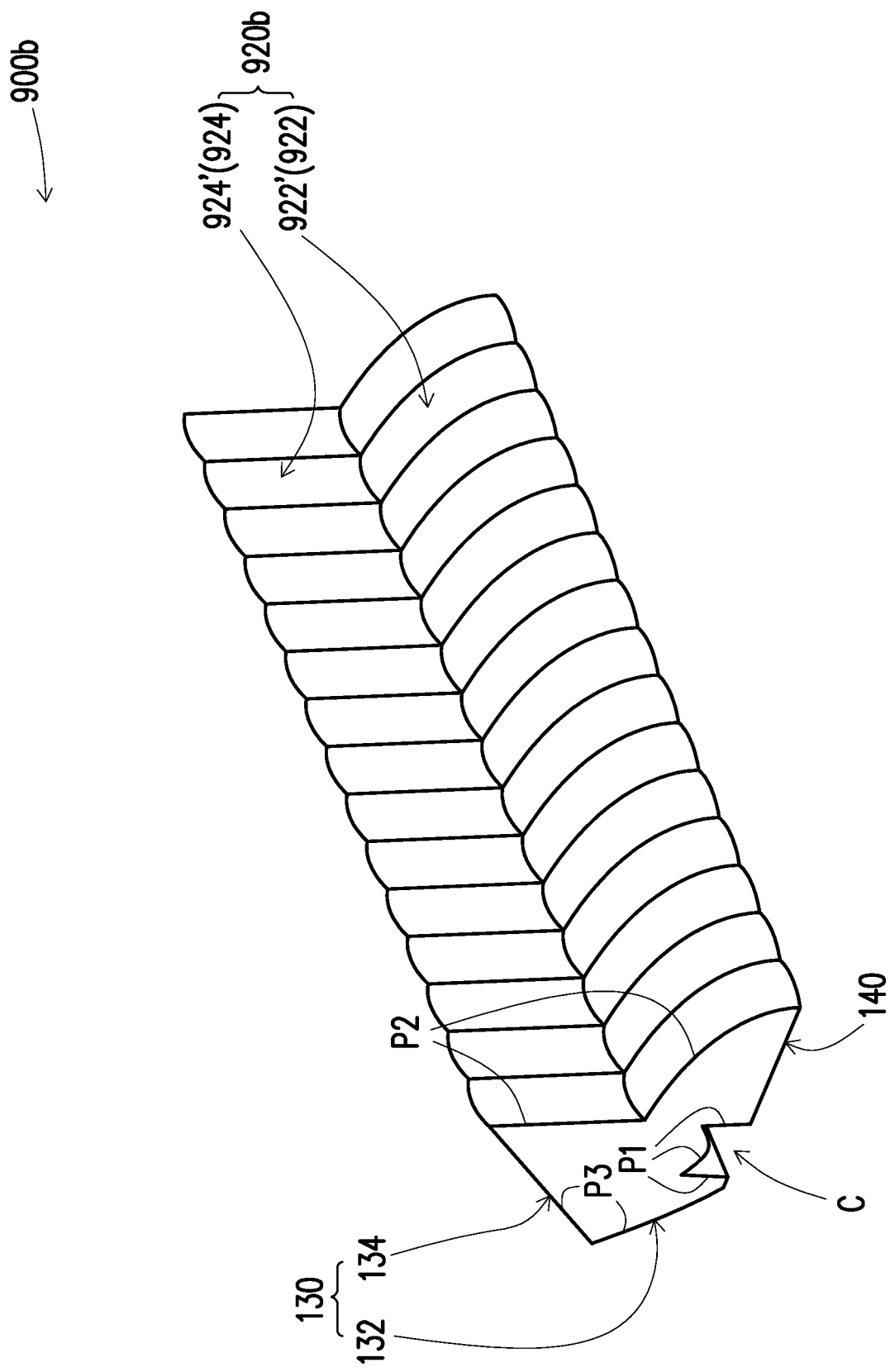
FIG. 9B is a perspective view of an optical element of another embodiment of the invention.

FIG. 8A is a perspective view of an optical element of an embodiment of the invention. FIG. 8B is a sectional view of a light assembly using the optical element of FIG. 8A. Referring to FIGS. 8A, 8B, the light assembly 80 is similar to the light assembly 10 in FIG. 1, the optical element 800 is similar to the optical element 100 in FIG. 1. Therefore, the light assembly 80 and the optical element 800 are no longer repeated hereafter. The main difference therebetween is that the first segment light entry surface 110a, the first segment light emission surface 120a, and the first segment reflecting surface 130a are respectively surfaces of revolution formed by rotating first, second and third lines P1, P2, P3 around a first reference axis A1 by a first angle. The second segment light entry surface 110b, the second segment light emission surface 120b, and the second segment reflecting surface 130b all extend along the same extension direction ED (as shown in FIG. 8A). The third segment light entry surface 110c, the third segment light emission surface 120c, and the third segment reflecting surface 130c are respectively surfaces of revolution formed by rotating fourth, fifth, sixth lines P4, P5, P6 on a second reference plane E2 around a second reference axis A2 on the second reference plane E2 by a second angle. The first reference axis A1 is parallel to the second reference axis A2. The extension direction ED is perpendicular to the first reference axis A1.

In this embodiment, the first reference axis A1 is located at a side away from the light emission surface 120 and passes through a bending point BP1 of the third line P3, the second reference axis A2 is located at a side away from the light emission surface 120 and passes through a bending point BP2 of the sixth line P6, and the first reference plane E1 and the second reference plane E2 are coplanar. The first and fourth lines P1, P4 correspond to the sectional line of the light entry surface 110 in FIG. 1. The second and fifth lines P2, P5 correspond to the sectional line of the light emission surface 120 in FIG. 1. The third and sixth lines P3, P6 correspond to the sectional line of the reflecting surface 130 in FIG. 1. The first rotating angle of the first, second and third lines P1, P2, P3 around the first reference axis A1 is 90 degrees. The second rotating angle of the fourth, fifth, and sixth lines P4, P5, P6 around the second reference axis A2 is 90 degrees. However, in other embodiments, the first and second rotating angles may be another angle beyond 90 degrees.

In an embodiment, a plurality of light sources S could be disposed in the recess C.

Figure 10A:
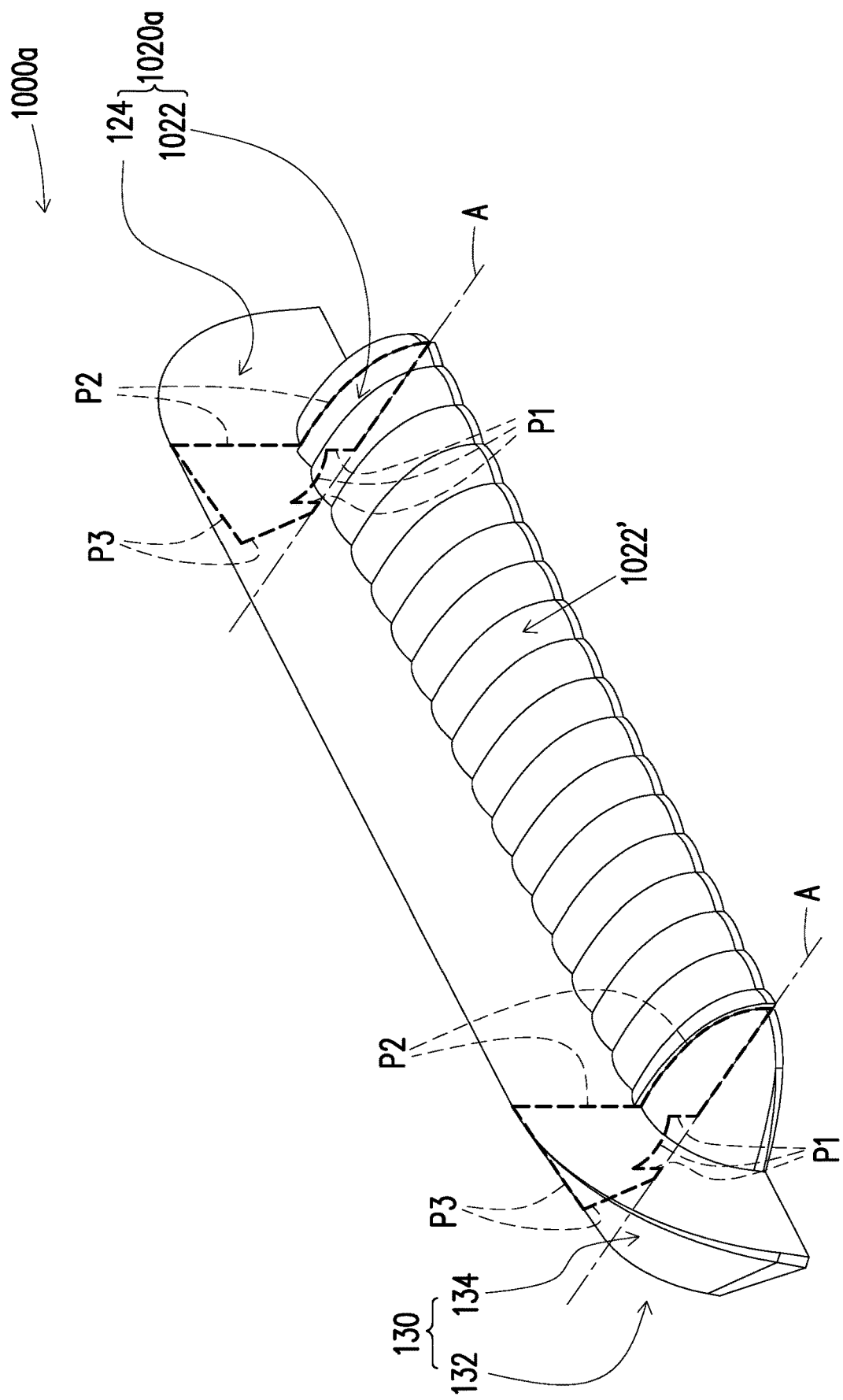
FIG. 10A is a perspective view of an optical element of an embodiment of the invention.
Figure 10B:
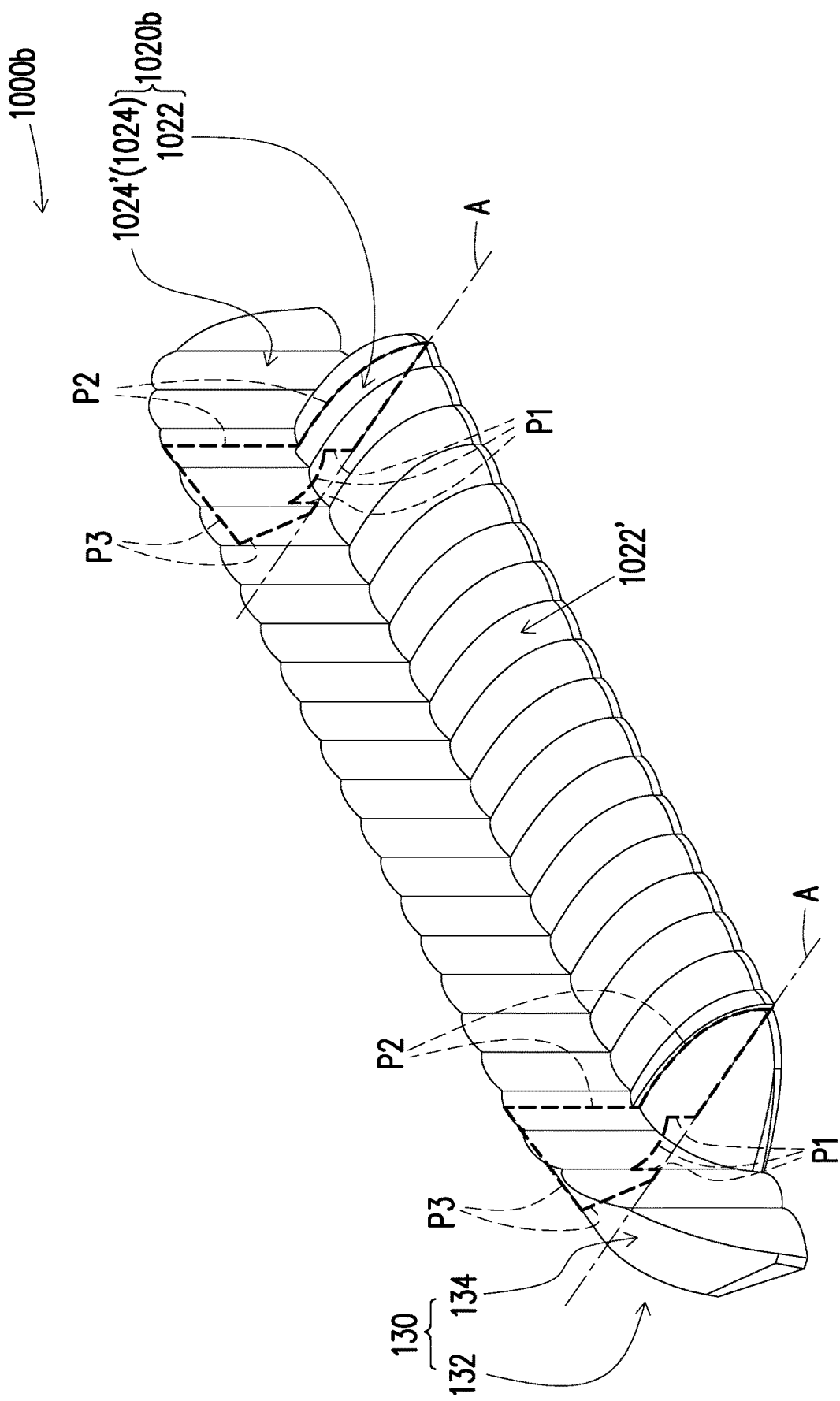
FIG. 10B is a perspective view of an optical element of another embodiment of the invention.

FIG. 10A is a perspective view of an optical element of an embodiment of the invention. FIG. 10B is a perspective view of an optical element of another embodiment of the invention. Referring to FIGS. 10A, 10B, the optical elements 1000a, 1000b are similar to the optical element 100 in FIG. 1. Therefore, the optical elements 1000a, 1000b are no longer repeated hereafter. For clarity, the drawings merely schematically illustrate front view surface contours of the optical elements 1000a, 1000b and the first, second and third lines P1, P2, P3. However, it is understood that the optical elements 1000a, 1000b are formed of a transparent material, so internal structural contours are substantially visible. Referring to FIG. 10A first, the optical element 1000a is similar to the optical element 900a in FIG. 9A, and a main difference is that two ends of the optical element 1000a are similar to the optical element 200 in FIGS. 2A, 2B, wherein two ends of the light entry surface 110, a light emission surface 1020a, and the reflecting surface 130 are respectively surfaces of revolution formed by rotating first, second and third lines P1, P2, P3 around a reference axis A located on the bottom surface 140 by an angle, and a plurality of arc-shaped light emission sub-surfaces 1022' of a first light emission sub-surface 1022 are not disposed at two ends of the first light emission sub-surface 1022. The angle by which the first, second and third lines P1, P2, P3 are rotated around the reference axis A is 90 degrees. However, in other embodiments, the angle by which the first, second and third lines P1, P2, P3 are rotated around the reference axis A may also be another angle. Next, referring to FIG. 10B, the optical element 1000b is similar to the optical element 1000a of FIG. 10A, and a main difference is that a second light emission sub-surface 1024 of a light emission surface 1020b of the optical element 1000b has a plurality of arc-shaped light emission sub-surfaces 1024' (e.g., arc-shaped convex surfaces). These arc-shaped light emission sub-surfaces 1024' extend from a side close to the second reflecting sub-surface 134 to a side close to the first light emission sub-surface 1022, and the arc-shaped light emission sub-surfaces 1024' are arranged in sequence along a direction perpendicular to the extension direction of the arc-shaped light emission sub-surfaces 1024'.

In summary of the above, in the optical element of the embodiments of the invention, after passing through the light entry surface, the light exits the optical element towards the one side of the light emission surface. Accordingly, the optical element efficiently redirects the light to a lighting direction. Similarly, as the light assembly of the embodiments of the invention includes the optical element, the light is efficiently redirected to a lighting direction and exhibits a greater light intensity. Moreover, in addition to the application to head lights or warning lights of vehicles, the light assembly of the embodiments of the invention is also applicable to illumination systems.

What is claimed is:

1. An optical element comprising:
a light entry surface configured to receive light emitted from at least one light-emitting diode;
a light emission surface having a first light emission sub-surface and a second light emission sub-surface, the first light emission sub-surface and the second light emission sub-surface being connected to each other;
a reflecting surface having a first reflecting sub-surface and a second reflecting sub-surface, the second reflecting sub-surface being connected between the first reflecting sub-surface and the second light emission sub-surface; and
a bottom surface connected between the first light emission sub-surface and the first reflecting sub-surface,
wherein a first portion of the light is transmitted to the light entry surface and the first light emission sub-surface in sequence so as to exit the optical element, a second portion of the light is transmitted to the light entry surface, the second reflecting sub-surface, and the second light emission sub-surface in sequence so as to exit the optical element, and a third portion of the light is transmitted to the light entry surface, the first reflecting sub-surface, the second reflecting sub-surface, and the second light emission sub-surface in sequence so as to exit the optical element,
wherein the first light emission sub-surface comprises a plurality of first arc-shaped light emission sub-surfaces, the first arc-shaped light emission sub-surfaces extend from the second light emission sub-surface to the bottom surface, and the first arc-shaped light emission sub-surfaces are arranged along a direction perpendicular to the extension direction thereof.

2. The optical element of claim 1, wherein the light entry surface comprises a first light entry sub-surface, a second light entry sub-surface, and a third light entry sub-surface, wherein the second light entry sub-surface is connected between the first light entry sub-surface and the third light entry sub-surface, and the first light entry sub-surface, the second light entry sub-surface, and the third light entry sub-surface form a recess, wherein the first portion, the second portion, and the third portion of the light respectively pass through the first light entry sub-surface, the second light entry sub-surface, and the third light entry sub-surface and enter the optical element.

3. The optical element of claim 2, wherein the recess is formed on the bottom surface.

4. The optical element of claim 3, wherein the second light emission sub-surface comprises a plurality of second arc-shaped light emission sub-surfaces, wherein the second arc-shaped light emission sub-surfaces extend from a side close to the second reflecting sub-surface to a side close to the first light emission sub-surface, and the second arc-shaped light emission sub-surfaces are arranged in sequence along a direction perpendicular to the extension direction of the second arc-shaped light emission sub-surfaces,
wherein the light entry surface comprises a first segment light entry surface, a second segment light entry surface, and a third segment light entry surface, the reflecting surface comprises a first segment reflecting surface, a second segment reflecting surface, and a third segment reflecting surface, wherein the second segment light entry surface is connected between the first segment light entry surface and the third segment light entry surface, and the second segment reflecting surface is connected between the first segment reflecting surface and the third segment reflecting surface,
wherein the first segment light entry surface and the first segment reflecting surface are respectively surfaces of revolution formed by rotating a first line and a third line on a first reference plane around a first reference axis on the first reference plane by a first angle, the second segment light entry surface and the second segment reflecting surface both extend along a same extension direction, and the third segment light entry surface and the third segment reflecting surface are respectively surfaces of revolution formed by rotating a fourth line and a sixth line on a second reference plane around a second reference axis on the second reference plane by a second angle,
wherein the first reference axis is parallel to the second reference axis, and the extension direction is perpendicular to the first reference axis and the second reference axis.

5. The optical element of claim 3, wherein the light entry surface comprises a first segment light entry surface, a second segment light entry surface, and a third segment light entry surface, the reflecting surface comprises a first segment reflecting surface, a second segment reflecting surface, and a third segment reflecting surface, wherein the second segment light entry surface is connected between the first segment light entry surface and the third segment light entry surface, and the second segment reflecting surface is connected between the first segment reflecting surface and the third segment reflecting surface,
- wherein the first segment light entry surface and the first segment reflecting surface are respectively surfaces of revolution formed by rotating a first line and a third line on a first reference plane around a first reference axis on the first reference plane by a first angle, the second segment light entry surface and the second segment reflecting surface both extend along a same extension direction, and the third segment light entry surface and the third segment reflecting surface are respectively surfaces of revolution formed by rotating a fourth line and a sixth line on a second reference plane around a second reference axis on the second reference plane by a second angle,
- wherein the first reference axis is parallel to the second reference axis, and the extension direction is perpendicular to the first reference axis and the second reference axis.

6. The optical element of claim 1, wherein the first portion, the second portion, and the third portion of the light exit the optical element towards a same side of the optical element.

7. The optical element of claim 1, wherein a divergence angle of a light including the first portion of the light, the second portion of the light, and the third portion of the light exiting from the light emission surface of the optical element is within approximately 10 degrees.

8. The optical element of claim 1, wherein the second light emission sub-surface comprises a plane or a curved surface.

9. The optical element of claim 1, further comprising a reflective layer formed on the reflecting surface.

10. A light assembly comprising:
- a light source configured to emit light; and
- the optical element of claim 1, wherein the optical element is disposed on a transmission path of the light.

11. The light assembly of claim 10, wherein the light source comprises a light-emitting diode or a high-intensity discharge lamp.

12. An optical element comprising:
- a light entry surface configured to receive light emitted from at least one light-emitting diode;
- a light emission surface having a first light emission sub-surface and a second light emission sub-surface, the first light emission sub-surface and the second light emission sub-surface being connected to each other; and
- a reflecting surface having a first reflecting sub-surface and a second reflecting sub-surface, the second reflecting sub-surface being connected between the first reflecting sub-surface and the second light emission sub-surface,
- wherein a first portion of the light is transmitted to the light entry surface and the first light emission sub-surface in sequence so as to exit the optical element, a second portion of the light is transmitted to the light entry surface, the second reflecting sub-surface, and the second light emission sub-surface in sequence so as to exit the optical element, and a third portion of the light is transmitted to the light entry surface, the first reflecting sub-surface, the second reflecting sub-surface, and the second light emission sub-surface in sequence so as to exit the optical element,
- wherein the second light emission sub-surface comprises a plurality of arc-shaped light emission sub-surfaces, wherein the arc-shaped light emission sub-surfaces extend from a side close to the second reflecting sub-surface to a side close to the first light emission sub-surface, and the arc-shaped light emission sub-surfaces are arranged in sequence along a direction perpendicular to the extension direction thereof.

13. A light assembly comprising:
- a light source configured to emit light; and
- the optical element of claim 12, wherein the optical element is disposed on a transmission path of the light.

14. An optical element comprising:
- a light entry surface configured to receive light emitted from at least one light-emitting diode;
- a light emission surface having a first light emission sub-surface and a second light emission sub-surface, the first light emission sub-surface and the second light emission sub-surface being connected to each other; and
- a reflecting surface having a first reflecting sub-surface and a second reflecting sub-surface, the second reflecting sub-surface being connected between the first reflecting sub-surface and the second light emission sub-surface,
- wherein a first portion of the light is transmitted to the light entry surface and the first light emission sub-surface in sequence so as to exit the optical element, a second portion of the light is transmitted to the light entry surface, the second reflecting sub-surface, and the second light emission sub-surface in sequence so as to exit the optical element, and a third portion of the light is transmitted to the light entry surface, the first reflecting sub-surface, the second reflecting sub-surface, and the second light emission sub-surface in sequence so as to exit the optical element,
- wherein at least portions of the light entry surface, the light emission surface, and the reflecting surface are respectively surfaces of revolution formed by rotating a first line, a second line, and a third line of a first reference plane around a first reference axis on the first reference plane by a first angle.

15. The optical element of claim 14, wherein the first angle is 180 degrees or 360 degrees.

16. The optical element of claim 14, wherein the light entry surface comprises a first segment light entry surface, a second segment light entry surface, and a third segment light entry surface, the light emission surface comprises a first segment light emission surface, a second segment light emission surface, and a third segment light emission surface, the reflecting surface comprises a first segment reflecting surface, a second segment reflecting surface, and a third segment reflecting surface, wherein the second segment light entry surface is connected between the first segment light entry surface and the third segment light entry surface, the second segment light emission surface is connected between the first segment light emission surface and the third segment light emission surface, and the second segment reflecting surface is connected between the first segment reflecting surface and the third segment reflecting surface,
- wherein the first segment light entry surface, the first segment light emission surface, and the first segment reflecting surface comprises the at least portions of the light entry surface, the light emission surface, and the reflecting surface; the second segment light entry surface, the second segment light emission surface, and the second segment reflecting surface all extend along a same extension direction; and the third segment light entry surface, the third segment light emission surface, and the third segment reflecting surface are respectively surfaces of revolution formed by rotating a fourth line, a fifth line, and a sixth line on a second reference plane around a second reference axis on the second reference plane by a second angle, wherein the first reference axis is parallel to the second reference axis, and the extension direction is perpendicular to the first reference axis and the second reference axis.

17. The optical element of claim 14, wherein the light entry surface comprises a first light entry sub-surface, a second light entry sub-surface, and a third light entry sub-surface, the second light entry sub-surface is connected between the first light entry sub-surface and the third light entry sub-surface, and the first portion, the second portion, and the third portion of the light respectively pass through the first light entry sub-surface, the second light entry sub-surface, and the third light entry sub-surface and enter the optical element wherein the second light entry sub-surface of the light entry surface is located between the first reference axis and the second reflecting sub-surface of the reflecting surface.

18. The optical element of claim 14, wherein the reflecting surface is located between the first reference axis and the light emission surface.

19. The optical element of claim 14, wherein the second reflecting sub-surface of the reflecting surface is located between the first reference axis and the light entry surface.

20. A light assembly comprising:
a light source configured to emit light; and
the optical element of claim 14, wherein the optical element is disposed on a transmission path of the light.

* * * * *